United States Patent Office.

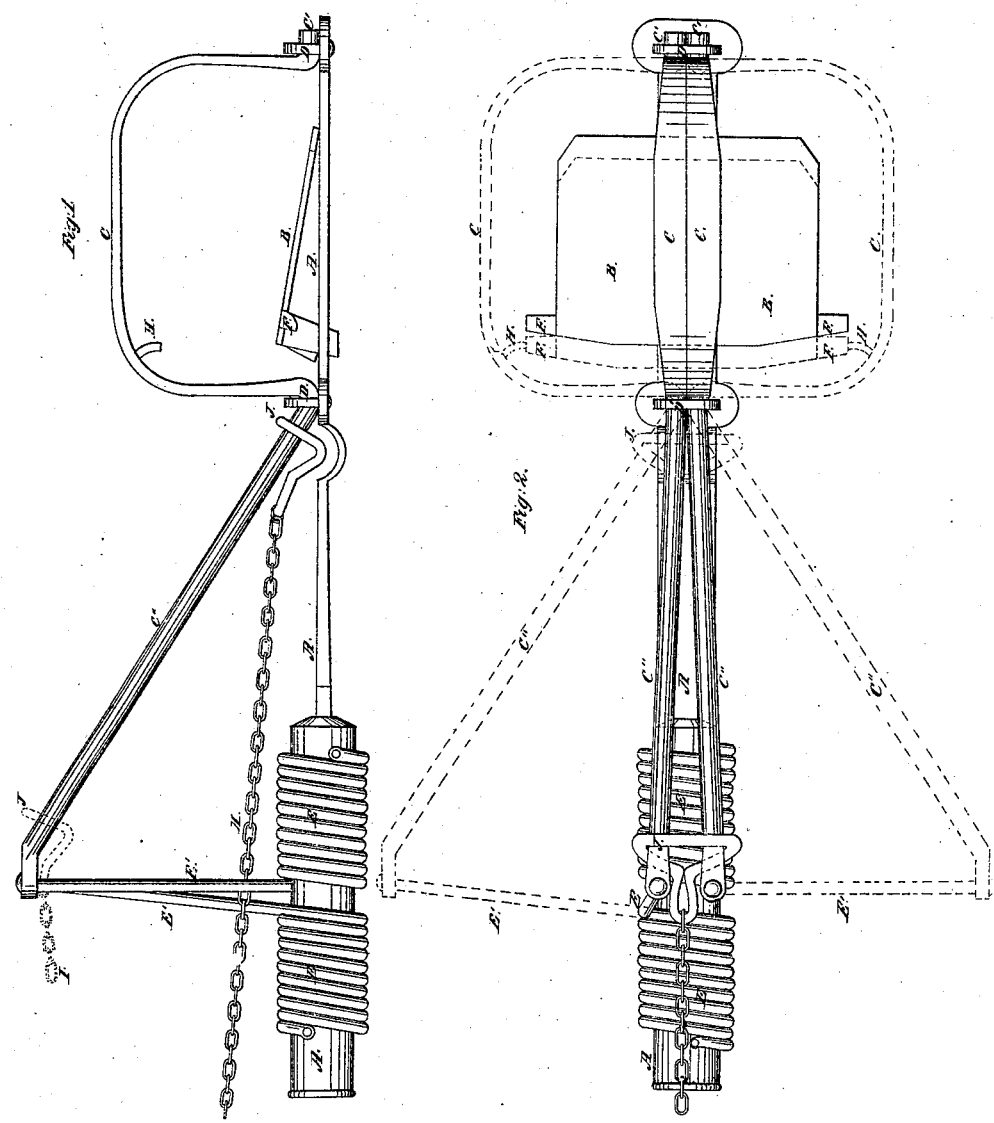

GEORGE HART, OF GRANGER, OHIO.

ANIMAL-TRAP.

Specification of Letters Patent No. 18,092, dated September 1, 1857.

*To all whom it may concern:*

Be it known that I, GEORGE HART, of Granger, in the county of Medina and State of Ohio, have invented certain new and useful Improvements in Traps for Catching Animals; and I do hereby declare the following to be a full and exact description thereof, reference being had to the accompanying drawings, in which—

Figure 1 is a side view of my improved trap, and Fig. 2 a top view, with dotted lines showing the trap when set.

Like letters refer to like parts in both views.

A represents the base or bottom piece of the trap; B, the fall piece, this is inserted in the bottom piece in the ordinary manner; C, C, jaws which at one end are bent so as to form pivots C', C', and are at that end secured to the base by the staple D, passing over their bent ends; the other ends of the jaws passing under the staple D' and extending over the bottom piece at an acute angle, and forming arms C'', C''; E, E, two coiled springs which are attached to the end A' of the bottom piece, and which are wound in opposite directions around that end, it being round for that purpose. The ends E', E', of the springs extend upward and are secured to the arms C'', C''.

The trap being set in the usual manner, as shown in Fig. 2, when the animal steps upon the fall B, the catches F, F, are thrown off the pins H, H, in the ordinary manner, and there being nothing then to prevent the jaws from closing, the recoil of the springs E, E, bring them immediately together. When the animal caught struggles and pulls to get away, he, by these efforts, pulls upon the chain I, which is secured by a stake, or otherwise firmly fixed; the pulling upon the chain I, draws the ring or loop J, back toward the ends of the arms C'', C'', and these arms being wider apart at the point of connection with the springs than at the point where they pass under the staple D', the drawing back of the ring J tightens the grasp of the jaws, consequently the more the animal struggles the tighter will be the grasp of the jaws.

It often happens, in ordinary spring traps, that animals, by struggling violently, loosen the jaws sufficiently to make their escape, but in my improvement, the jaws are constantly being tightened, in proportion to the efforts made by the animal to extricate itself.

To set the trap again the ring J, is allowed to slip down on the arms C'' C'', as seen at I', I', and the jaws are turned down so that the pins H, H, are brought under the catches F, F. This turning down of the jaws, tightens the coil of the springs upon the arm A'; hence, when the jaws are released, from the catches F, F, the recoil of the springs, throws the jaws immediately together.

What I claim as my improvement, and desire to secure by Letters Patent, is

The arms C'', C'', springs E, E, and ring J, when arranged substantially as herein set forth, for the purpose described.

GEORGE HART.

Witnesses:
JOHN COON,
HENRY G. ABBEY.